US011137279B2

(12) United States Patent
Linton et al.

(10) Patent No.: US 11,137,279 B2
(45) Date of Patent: Oct. 5, 2021

(54) LIQUID LEVEL SENSOR (71) Applicant: Walbro LLC, Tucson, AZ (US)

(72) Inventors: Robby L. Linton, Saginaw, MI (US); Edward J. Talaski, Caro, MI (US)

(73) Assignee: Walbro LLC, Cass City, MI (US)

( * ) Notice: Subject to any disclaimer, the term of this patent is extended or adjusted under 35 U.S.C. 154(b) by 160 days.

(21) Appl. No.: 16/481,503

(22) PCT Filed: Jan. 30, 2018

(86) PCT No.: PCT/US2018/015911
§ 371 (c)(1),
(2) Date: Jul. 29, 2019

(87) PCT Pub. No.: WO2018/144442
PCT Pub. Date: Aug. 9, 2018

(65) Prior Publication Data
US 2019/0360851 A1 Nov. 28, 2019

Related U.S. Application Data (60) Provisional application No. 62/452,662, filed on Jan. 31, 2017.

(51) Int. Cl.
G01F 23/36 (2006.01)
G01D 5/165 (2006.01)
H01C 10/32 (2006.01)

(52) U.S. Cl.
CPC .......... *G01F 23/363* (2013.01); *G01D 5/165* (2013.01); *H01C 10/32* (2013.01)

(58) Field of Classification Search
CPC ........ G01F 23/30; G01F 23/32; G01F 23/363; G01D 5/165; G01D 5/251; H01C 10/32
See application file for complete search history.

(56) References Cited

U.S. PATENT DOCUMENTS

| 4,967,181 A | 10/1990 | Iizuka et al. |
| 7,091,819 B1 | 8/2006 | Forgue |
| 2004/0163465 A1 | 8/2004 | Kim et al. |
| 2006/0266112 A1 | 11/2006 | Crary et al. |

FOREIGN PATENT DOCUMENTS

WO WO0231449 A1 4/2002

OTHER PUBLICATIONS

Written Opinion & International Search Report for PCT/US2018/015911 dated May 16, 2018, 13 pages.

*Primary Examiner* — Benjamin R Schmitt
(74) *Attorney, Agent, or Firm* — Reising Ethington P.C.

(57) ABSTRACT

A liquid level sensor includes a liquid level responsive member that moves in response to changing liquid level, an electrically conductive contact associated with the liquid level responsive member, a circuit including a rectifying element and a) one or more conductive elements, or b) one or more resistive elements or c) one or more conductive elements and one or more resistive elements, wherein the contact is arranged to engage at least one of the elements in a, b, or c, and a power supply. The power supply is adapted to provide a voltage to the circuit causing a current flow in a first direction in the circuit wherein the current flows through the contact and to provide a current flow in a second direction in the circuit wherein the rectifying element prevents current flow through the contact.

10 Claims, 6 Drawing Sheets

LIQUID LEVEL SENSOR

REFERENCE TO RELATED APPLICATIONS

This application claims the benefit of U.S. Provisional Application Ser. No. 62/452,662 filed on Jan. 31, 2017, the entire contents of which are incorporated herein by reference in its entirety.

TECHNICAL FIELD

The present disclosure relates generally to liquid level sensors, and more particularly to liquid level sensors that include a liquid level responsive member and a sensor arrangement responsive to the position of the liquid level responsive member.

BACKGROUND

A fuel level sensor may include a float linked to a wiper of a variable resistor assembly to vary the resistance value of the resistor in accordance with the position of the float which tracks the level of fuel in a fuel tank. As the level of fuel within the fuel tank changes, the float moves and thereby varies the effective resistance of the variable resistor. In accordance with the change in resistance, an output signal changes and, thus, effects a change—such as from "full" toward "empty"—in a remote fuel level indicator. The accuracy of the fuel level indication may be affected by the placement of the fuel level sensor (e.g. the float) within the fuel tank and changes in the position of the fuel level sensor. Further, the resistance values of variable resistors in different fuel level sensors may be different from each other and may vary over time, which can affect the fuel level indication.

SUMMARY

In at least some implementations, a liquid level sensor, includes a liquid level responsive member that moves in response to changing liquid level, an electrically conductive contact associated with the liquid level responsive member, a circuit including a rectifying element and a) one or more conductive elements, or b) one or more resistive elements or c) one or more conductive elements and one or more resistive elements, wherein the contact is arranged to engage at least one of the elements in a, b, or c, and a power supply. The power supply is adapted to provide a voltage to the circuit causing a current flow in a first direction in the circuit wherein the current flows through the contact and to provide a current flow in a second direction in the circuit wherein the rectifying element prevents current flow through the contact.

In at least some implementations, a liquid level sensor for determining the level of a liquid within a tank includes a float buoyant in the liquid within the tank, a float arm coupled to the float and moved by the float as the level of liquid in the tank changes, a contact carried by the float arm so that the contact moves with the float arm, a variable resistance circuit associated with the contact so that the total resistance in the circuit changes as the contact moves relative to the circuit, the circuit including a rectifying element, and a power supply that provides a voltage to the circuit causing a current flow in a first direction in the circuit wherein the current flows through the contact, and wherein the circuit is arranged so that the current also flows in a second direction in the circuit wherein the rectifying element prevents current flow through the contact.

At least some implementations of a method of determining a level of a liquid in a container, include providing a current flow in first direction in a circuit associated with a level sensor to obtain a first resistance value, providing a current flow in a second direction in the circuit to obtain a second resistance value, and determining a liquid level as a function of both the first resistance value and the second resistance value. In at least some implementations, the first resistance value is a maximum resistance value in the circuit and the second resistance value relates to a resistance value associated with an instantaneous liquid level. The second resistance value may be obtained at a lowest liquid level condition in a tank and the determined liquid level may be adjusted as a function of the difference between the first resistance value and the second resistance value.

In at least some implementations, a liquid level sensor includes a liquid level responsive member that moves in response to changing liquid level, a circuit associated with the liquid level responsive member so that a condition of the circuit changes as the position of the liquid level responsive member changes, a microcontroller associated with the circuit to detect or determine changes in said condition of the circuit, and memory associated with the microcontroller to store at least some of the detected or determined changes and to store instructions for operation of the microcontroller, wherein said instructions are changed as a function of the stored detected or determined changes.

BRIEF DESCRIPTION OF THE DRAWINGS

The following detailed description of certain embodiments and best mode will be set forth with reference to the accompanying drawings, in which.

DETAILED DESCRIPTION

Figure 1:
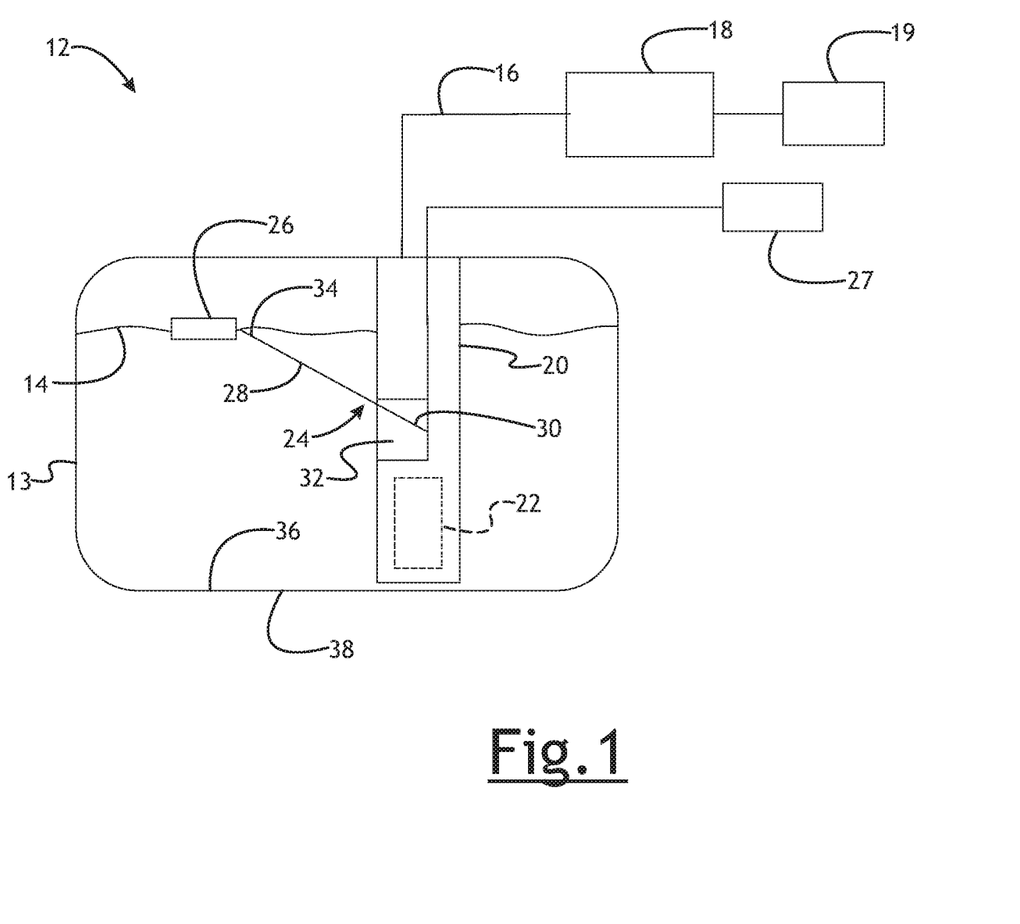
FIG. 1 is a diagrammatic representation of a tank containing a liquid, a liquid pump assembly and a liquid level sensor.

Referring in more detail to the drawings, FIG. 1 schematically illustrates part of a fuel supply system 12 including a fuel tank 13 for storing fuel 14 and supplying the fuel 14 through a fuel line 16 to an internal combustion engine 18 that powers a tool 19 (e.g. chainsaw, weed trimmer, lawnmower, leaf blower, etc.) or a vehicle (e.g. motorcycle, all-terrain vehicle, boat, personal watercraft, automobile, etc.). The fuel supply system 12 may include a fuel pump module 20 that carries a fuel pump 22 that pumps fuel 14 out of the fuel tank 13 to the engine 18. The fuel pump module 20 may also include a fuel level sensor 24 that determines or facilitates determination of the level of the fuel 14 within the fuel tank 13 and sends a signal indicative of the fuel level to a fuel level indicator 27. While described herein with regard to a fuel tank and liquid fuel, the level sensor may be utilized in a container other than a fuel tank to determine the level of a liquid other than fuel within the container.

Still referring to FIG. 1, the fuel level sensor 24 preferably includes a fuel level responsive member, such as a float 26 that is buoyant in the fuel which may be coupled to a float arm 28. The float arm 28 may have a base end 30 mounted to a body 32 of the sensor 24 or to another component in the fuel system (e.g. the fuel pump module 20 or tank 13) and a distal end 34 coupled to the float 26. The float 26 may be of any desired size and shape and is constructed such that it floats on the surface of the fuel 14 contained within the fuel tank 13. The float arm 28 may be pivoted about the base end 30 and have a length dictated by the shape or depth of the fuel tank 13. In at least some implementations, the float arm 28 is long enough to allow the float 26 to float upon the surface of the fuel 14 between a maximum and minimum elevation that correspond to full and empty fuel tank conditions. In at least some implementations, at least one of which will be set forth herein, the float 26 may engage an inside surface 36 of a bottom wall 38 of the fuel tank 13 to enable increased accuracy with regard to fuel remaining in the fuel tank. As the fuel level in the fuel tank 13 changes, the float 26 rises or lowers with the surface of the fuel 14 causing the float arm 28 to pivot about the base end 30. As will be set forth in more detail below, the float arm 28 carries or is otherwise operably associated with one or more sensor elements (such as metallic contacts) 40, shown in FIGS. 2 and 3 that are moved along an arc as the float arm 28 pivots in response to a changing fuel level within the fuel tank 13.

Figure 2:
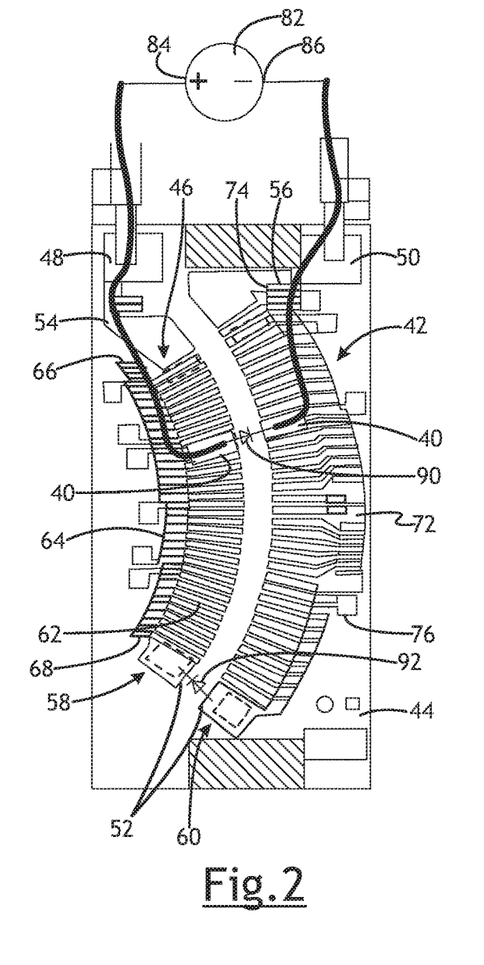
FIG. 2 is a plan view of a substrate that carries a variable resistance fuel level sensor circuit, and illustrating a current flow path when current flows in a first direction.
Figure 3:
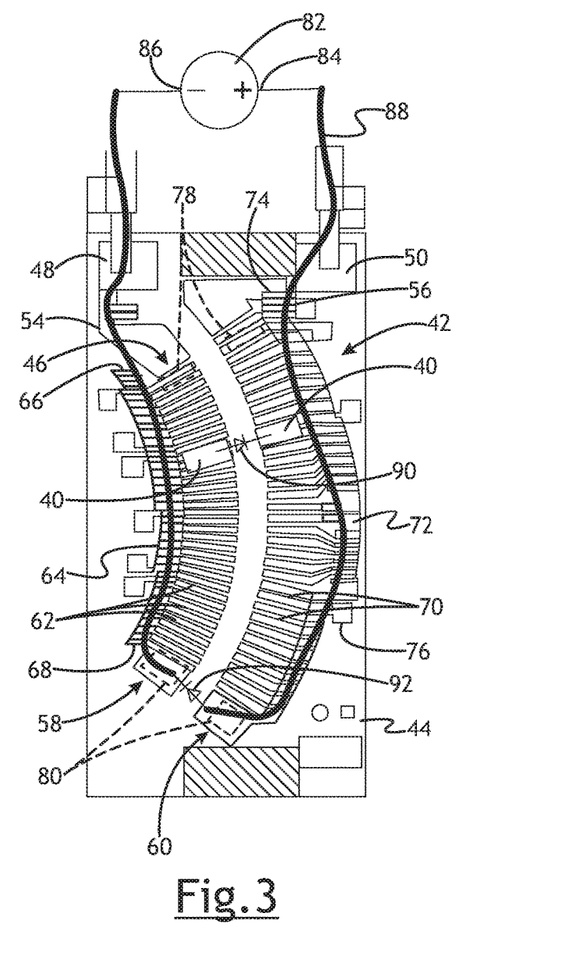
FIG. 3 is a plan view of a substrate that carries a variable resistance fuel level sensor circuit, and illustrating a current flow path when current flows in a second direction.

Referring now to FIGS. 2 and 3, the fuel level sensor 24 also includes a variable resistor circuit 42 that is carried by the sensor body 32 and which may include a ceramic substrate 44 imprinted with variable resistor elements or traces. The circuit 42 may include electrically conductive connection pads 48, 50 that are imprinted upon the ceramic substrate 44 and to which one or more wires may be connected (e.g. soldered). The variable resistor circuit 42 also includes one or more contact areas 52 that are imprinted on the ceramic substrate 44. The contact areas 52 are arranged for cooperation with the contacts 40 associated with the float arm 28 so that the contacts sweep across the contact areas as the float 26 moves in response to changes in the liquid level in the fuel tank 13. In the example shown, the contact areas 52 are generally semi-circular or arcuate in shape. First and second printed wires, or electrically conductive pathways 54, 56, are imprinted upon the ceramic substrate 44 to electrically communicate the conductive connection pads 48, 50 with the contact areas 52.

In at least one implementation, the contact areas 52 include a first generally resistive contact area 58 and a second generally resistive contact area 60. The first contact area 58 is preferably segmented to define a plurality of conductive contact segments 62 that are separated by open spaces. The plurality of conductive contact segments 62 is communicated to a corresponding resistor trace 64 that has an effective resistance that increases incrementally from the end 66 of the arc 58 that is connected to the printed wire 54 to the opposite end 68.

As shown in FIGS. 2-5, the second contact area 60 may be constructed similarly to the first contact area 58 and have a plurality of conductive segments 70 coupled to a second resistive trace 72 that has a resistance that increases from one end 74 to the other end 76. The second contact area 60 may be spaced radially outside of the first contact area 58, and the float arm 28 may carry two contacts 40 with a first contact engaged with the first contact area and a second contact engaged with the second contact area. The two contacts 40 and two resistive contact areas 58, 60 may improve the reliability and accuracy of the level sensor 24.

The contact areas, pads, wires and the like of the variable resistor circuit 42 may be produced using any suitable process known to those of ordinary skill in the art, including but not limited to screen printing, depositing molten material, chemically etching and/or coating the substrate 44, attaching or adhering separately manufactured elements to the ceramic substrate 44, and the like. In at least some implementations, the first and second contact areas 58, 60 and the plurality of conductive contact segments 62, are all preferably composed of a thick film conductive "ink" material.

As shown in FIGS. 2 and 3, the contacts 40 each engage their respective contact area 58, 60 and the resistance at that position of the contacts can be detected or determined, and then correlated with a fuel level (or volume of remaining fuel) in the fuel tank 13. With the contacts 40 located between the ends of the float arm 28, the contacts will be vertically higher along the contact areas 58, 60 when the fuel tank 13 is full than when the fuel tank is empty. When the fuel tank 13 is full, the contacts 40 may be at or near the position 78, and when the fuel tank is empty, the contacts may be at or near the position 80, both shown in dashed lines in FIG. 3.

To determine the resistance in the fuel level sensor circuit at a given time, electrical power (e.g. from a battery 82 or other source) is applied to the circuit 42. In the example shown in FIG. 2, the circuit 42 includes and current flows from the battery positive terminal 84, second contact area 60, conductive segment 70 engaged by the second contact 40, the second contact 40, the first contact 40, the conductive segment 62 engaged by the first contact 40, the first contact area 58 and the battery negative terminal 86, as shown by path 88 drawn on the circuit 42 to illustrate the current path. The total resistance in the circuit 42 is a function of the position of the contacts 40 on the contact areas 58, 60 as the amount of the resistive traces 64, 72 through which the current must flow is directly related to the position of the contacts on the contact areas. In the example shown, the current has to flow through a greater length (e.g. almost the entire length) of the resistive traces 64, 72 when the fuel tank 13 is empty and a lesser length (e.g. almost none of the length) when the fuel tank is full, so there is greater resistance in the circuit 42 when the tank is empty than when the tank is full. In the example shown, the first and second contacts 40 are electrically connected by a first rectifier 90 (e.g. a diode) arranged between them in the circuit 42. The diode 90 permits current flow in the direction just described, hereafter called the first or forward direction, but prevents current in an opposite direction, hereafter called a second or reverse direction, from flowing through the contacts 40.

As shown in FIG. 3, current in the second or reverse direction instead flows through the entire length of the resistive traces 64, 72 (from the first resistive trace to the second resistive trace) and thus provides a signal equal to the maximum resistance available in the circuit 42. In the example shown, the first resistive trace and second resistive trace are coupled together by a second rectifier 92 (e.g. a diode) that enables current flow in the reverse direction and prevents current flow in the forward direction. Accordingly, applying current in the forward direction results in current flowing through the contacts 40 and a resultant resistance that is a function of the position of the contacts on the contact areas 58, 60 which corresponds to the fuel level in the fuel tank 13. And applying current in the reverse direction results in current flowing through the second diode 92 and a resultant maximum resistance value in circuit 42 that may be used to calibrate the system and otherwise, as noted below.

Figure 6:
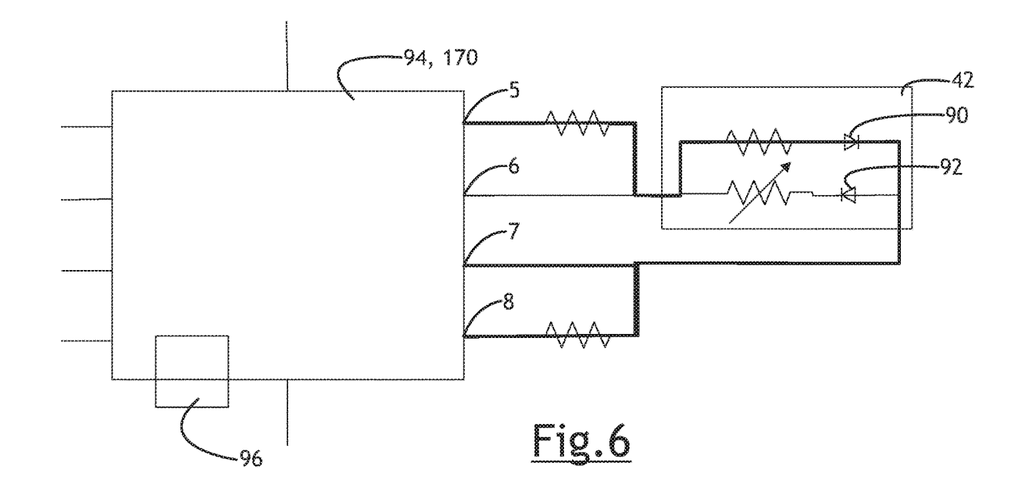
FIG. 6 is a schematic illustration of a microcontroller and a circuit with current flow in a first direction.
Figure 7:
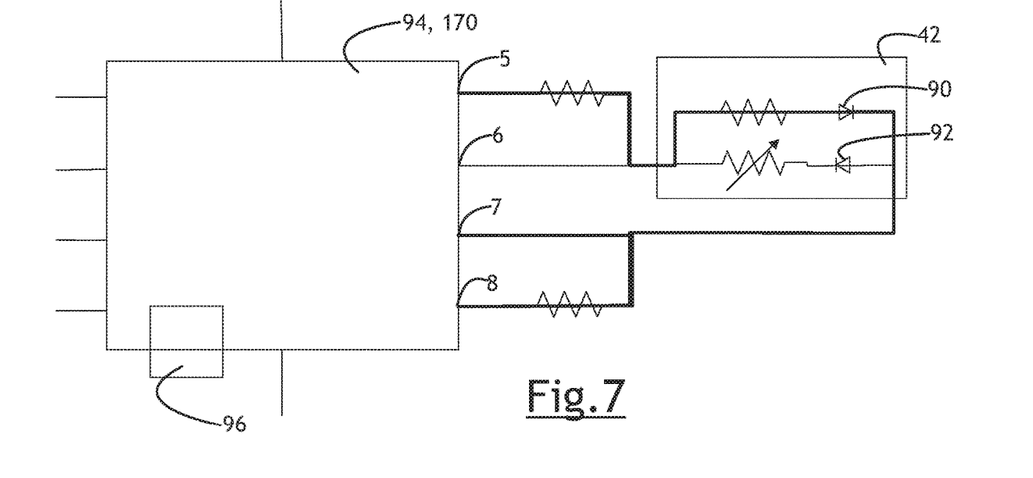
FIG. 7 is a schematic illustration of a microcontroller and a circuit with current flow in a second direction.

The current can be reversed by any suitable mechanism or circuitry, such as an H-bridge or other arrangement. In FIGS. 6 and 7, a microcontroller 94 is illustrated as being electrically coupled to the fuel level sensor circuit 42 at pins 5 and 8 which function as reversible inputs/outputs. Microcontrollers may include or comprise a microprocessor and/or other control device (whether "micro" or not) and are known to skilled artisans and thus will not be fully described herein.

In a first mode of operation shown in FIG. 6, an output voltage is provided from pin 5 that results in a current that flows to the second contact area 60 which then flows through the contacts 40 and first diode 90, and the first contact area 58 (e.g. as shown in FIG. 2). This permits a determination of the magnitude of the resistance that corresponds to the instantaneous position of the contacts 40 and hence, the instantaneous fuel level. In a second mode of operation shown in FIG. 7, an output voltage is provided from pin 8 that results in a current that flows in the opposite direction to enable a determination of the maximum resistance in the circuit 42 (e.g. as shown in FIG. 3). This permits, among other things, an accurate determination of the level of fuel when the tank is empty, which can be used to improve the accuracy of the instantaneous readings as will be set forth below.

Due to variations in products within a production run of such products, the position of the float arm 28, sensor 32, a bottom wall 38 of the fuel tank 13, and other things may vary from one fuel system 12 to the next. Likewise, the actual resistance values in the first and second contact areas 58, 60 may vary from one sensor to another. Hence, assuming a position or location for any of these or assuming a resistance in the fuel level sensor circuit 42 associated with an empty tank can result in deviations from one fuel system to the next as to the actual fuel available in the fuel tank when the sensor 24 provides a signal indicating that the fuel tank is empty. This error can be carried forward into other indications provided from the fuel level sensor 24.

In the example shown, providing an actual determination of resistance at the empty position of the float 26 can be done as often as desired (e.g. by providing current in the second direction). This information can be stored and utilized by a controller (suitably powered up and active), which may include the microcontroller 94 and suitable memory 96, to enable a more accurate indication of the empty condition of the fuel tank 13. This information can be obtained when the fuel level sensor 24 is first installed in the fuel tank 13 to enable an initial calibration of the fuel level sensor, and it can be performed at different times in use of the fuel level sensor to determine the information over time as the sensor wears, to determine the information under different temperature or internal fuel tank pressure conditions. This data can be used to provide a more accurate fuel level indication over time, and under different operating conditions, instead of using one, static data point that corresponds to an "empty" indication from the tank.

In at least some implementations, the float 26 is permitted to contact the lower wall 38 of the fuel tank 13. Contact between the float 26 and tank wall 38 can be confirmed in any suitable way, including a noted deceleration of the float 26 upon impact, by recording the highest resistance value indicated by the circuit 42, but noting that the resistance has not gone higher despite continued supply of fuel and use of the engine, or otherwise. Engagement of the float 26 with the lower wall 38 enables an accurate determination of the position of the lower wall 38 relative to the sensor 24, which can be different from one fuel system to the next, and within a fuel system under different operating conditions. The magnitude of resistance determined when the float 26 is engaged with the bottom wall 38 can be compared to the resistance determined when the current to the sensor is reversed and any difference can be stored and used by the microcontroller 94 to provide a more accurate fuel level determination in a given fuel system 12. In other words, the float 26 might (and in at least some implementations, should) contact the lower wall 38 of the fuel tank 13 before the contacts 40 reach the maximum resistance portion of the contact surfaces 58, 60, meaning that the true location of the bottom of the tank 13 is above the maximum travel of the float 26 and float arm 28. This may occur even when the tank is not fully empty, such as due to fuel moving or sloshing in the tank when lower fuel levels are present in the tank. This may facilitate a reduction in the quality standards regarding mounting of the level sensor 24 and related components as variations can automatically be accounted for (i.e. the position of the sensor relative to the bottom of the tank can be determined) as noted herein. The offset between the location of the contacts 40 when the float 26 engages the fuel tank lower wall 38 and the maximum resistance in the circuit 42 determined by reversing the current to the sensor, can be used throughout the range of movement of the float 26 and contacts. For example, the midpoint of the contact surfaces 58, 60 might likewise be offset from a location indicative of the float 26 location at which the fuel tank is ½ full. Accordingly, an adjustment may be made so that the offset is taken into account and a more accurate indication of a ½ full tank condition can be provided.

Like the recording and learning of the lowest point of travel of the float 26 as relates to an empty tank 13, the highest point of the float travel can be recorded, stored and used to better indicate a full tank condition. In many fuel tanks, fuel is not added until the tank is completely full and an upper region of the tank might contain fuel vapors and air, and not liquid fuel. Hence, so long as the float 26 is permitted to travel to the height of the maximum fuel level, the system can record and learn the resistance values associated with the maximum fuel level in the tank. As with the empty tank condition, this maximum fuel level can be learned over time and can be associated with different conditions, such as different temperatures and pressures to enable better fuel level determination in the future under similar operating conditions.

Figure 4:
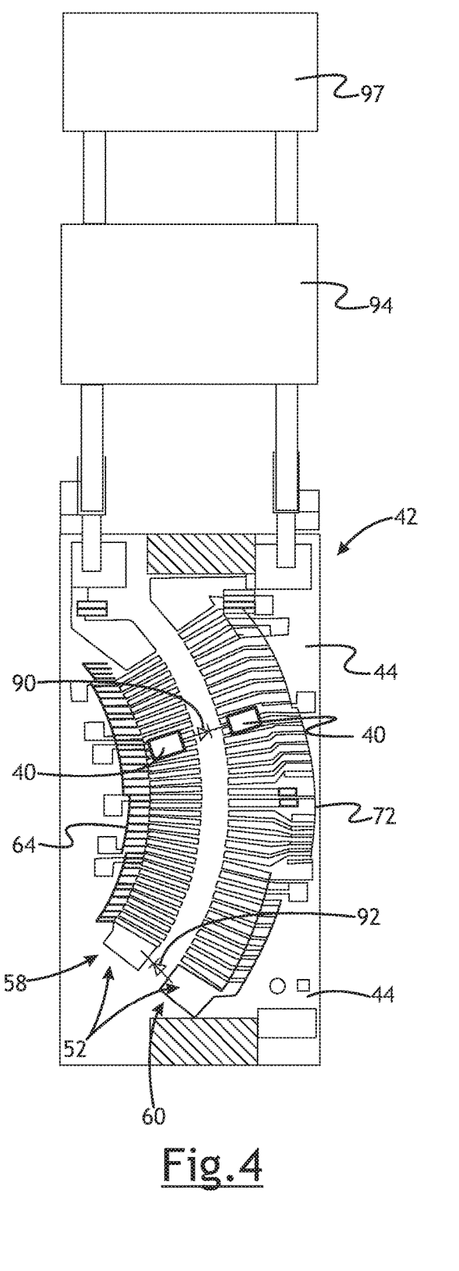
FIG. 4 is a plan view of a substrate that carries a variable resistance fuel level sensor circuit, and illustrating a first control system for receiving and conveying information from the level sensor.
Figure 5:
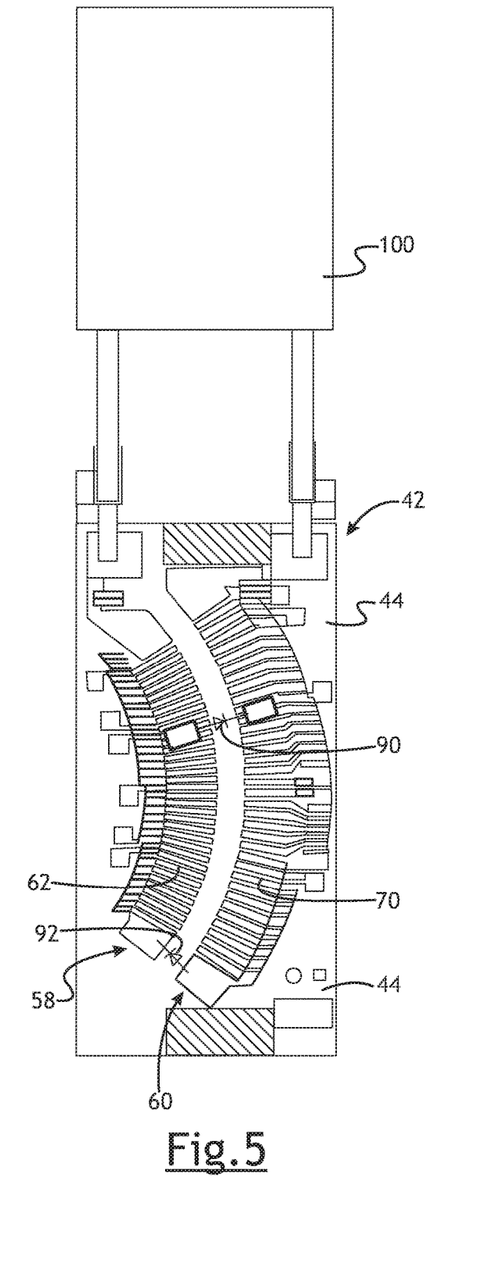
FIG. 5 is a plan view of a substrate that carries a variable resistance fuel level sensor circuit, and illustrating a second control system for receiving and conveying information from the level sensor.

FIGS. 4 and 5 show similar fuel level sensor substrates including similar contact surfaces and related traces. In FIG. 4, a microprocessor or controller 94 (sometimes called a microcontroller) is provided as part of the fuel level sensor. The controller 94 is communicated (via wired or wireless connection) with the sensor and runs or processes algorithms and instructions to determine the resistance in the circuit 42 at any desired time, and also to reverse the current and check or determine the maximum resistance in the circuit or other condition associated with a max empty fuel tank condition. The controller 94 is also communicated with an output 97 that provides an indication to a user of the fuel level in the fuel tank 13. The output 97 could be a visual gauge or other device that enables a user to determine the fuel level in the fuel tank 13. In FIG. 5, the controller or microprocessor 100 is not part of the fuel level sensor and is instead a microprocessor or controller that is used by the tool or vehicle to perform other functions associated with engine operation, or tool or vehicle performance. In one example, the controller 100 may be used in an ignition system to control ignition events (e.g. frequency or timing) in the combustion engine. A microprocessor 100 in the ignition system could also be used to monitor the fuel level in the fuel tank 13, and to run or process the algorithms and instructions as noted herein to facilitate more accurate fuel level indications. In FIG. 4, the fuel level sensor and controller can be easily provided to a customer and integrated with the customer device (e.g. tool 19 or vehicle), whereas the system of FIG. 5 may require more collaboration between the supplier and customer as the supplied fuel level sensor needs to provide outputs usable by an existing controller, microprocessor or gauge/display. Both systems may perform the same functions and be used in the same manner, as desired.

Many microcontrollers are available today that can perform the functions noted herein quickly and efficiently. Hence, the microcontroller 94 may perform additional functions with regard to more accurate fuel level reporting as well as for other systems related to the fuel system 12, engine or the tool 19 or vehicle that includes the engine 18. In at least one implementation, the microcontroller 94 varies its on/off duty cycle to not consume what would normally be power supplied at a generally steady voltage. Instead, the microcontroller 94 (and a circuit associated therewith) may operate at a reduced voltage, or the power may be provided at varying levels so that the total power consumption of the microcontroller is reduced. In at least one implementation, the power consumed by the microcontroller 94 (and associated circuit) may be varied as a function of the resistance sensed in the fuel level sensor circuit 42. The power consumption could then be reduced in at least some fuel level conditions, e.g. to conserve power, and the power consumption of the microcontroller 94 could be used by another device to determine the instantaneous fuel level in the fuel tank 13. In the latter situation, the power consumption of the microcontroller 94 could be monitored by a device that provides an indication of the fuel level to a user as a function of or corresponding to the power consumption of the microcontroller. In at least some implementations, the microcontroller may act as an interface between a fuel level sensing unit and an output (i.e. visible gauge or display in the vehicle) such that it can both receive power from the fuel level sensing unit and communicate fuel level to the output.

Additionally, the collaboration can include setting the voltage and/or power to the microprocessor in the circuit to a level that allows it to boot up when vehicle is turned on. Also, active elements on the circuit may include a diode, capacitor and a voltage regulating device that maintain or hold a voltage on the microprocessor that is more than the minimum voltage that is present at the junction of the circuit and vehicle interface. Additionally, a transistor (set forth in more detail below) that is controlled by the circuit can be turned on and off via PWM pulses to consume current to maintain a varying voltage across the circuit that is lower than the minimum voltage required to operate the microprocessor of the circuit. To reduce the net power consumption of the circuit or maintain voltage to the microprocessor, the microprocessor can be operated in sleep mode when the transistor is in the on state. Another example of the calibration may be to always have the vehicle interface supply sufficient voltage to the microprocessor to keep it running while monitoring or regulating the net consumed current of the microprocessor to relay or communicate the net fuel level.

Figure 8:
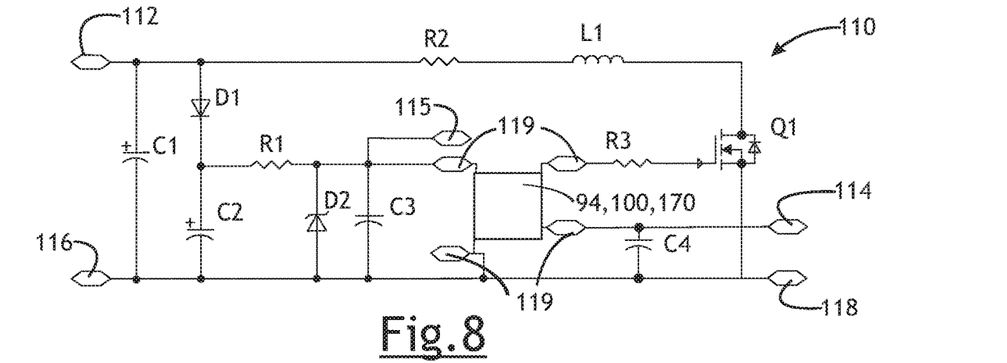
FIG. 8 is a circuit diagram for at least a portion of a control circuit that may be used with a microcontroller.

One schematic diagram of a circuit 110 that may be used in, by or with a microcontroller (e.g. 94 or 100) is shown in FIG. 8. This circuit 110 may be functionally arranged between the level sensor and an output (e.g. a gauge showing the fuel level) as shown by node 112 coupled to the gauge and node 114 coupled to the resistive element. Nodes 116 and 118 may be coupled to ground (e.g. via the gauge and sensor or otherwise). In this circuit: an optional capacitor C1 (e.g. charge storage device) provides a voltage source and may smooth out transient signals or power fluctuations; C2 is a another charge storage device/voltage supply capacitor for the microcontroller power supply; C3 is a power supply filter capacitor across the microcontroller pins (e.g. via node 115); C4 is an optional capacitor that may be needed only if the fuel level sensor type is or includes a variable resistor; D1 is a diode for the microcontroller power supply circuit that prevents the capacitor C2 from being drained when transistor Q1 is on; D2 is a zener diode that serves to clip the voltage to an amount appropriate to the microcontroller, such as 5V or 3.3V or the like; R1 is a resistor that may be used to limit current flow from capacitor C2 to diode D2 to create a more stable power supply to the microcontroller; R2 is a resistor in series with a switch, shown as a transistor Q1, to provide an appropriate current flow so the gauge will function correctly (as set forth in more detail below), this resistance depends upon the application and would be picked based on testing with the gauge being used; R3 is a resistor that may be used to protect the microprocessor pin that drives transistor Q1; L1 is an optional inductor in series with transistor Q1 to smooth out current ripples and allow a steadier current draw; and Q1 is a transistor the state of which (e.g. either on or off) is controlled by the microcontroller and which may be used as described above. While the switch Q1 is shown as a MOSFET, other types may be used as desired. The node 114 is coupled to the level sensor and may include more than one line or coupling as is appropriate for the type of sensor being used. For example, at least some variable resistor type sensors may need two lines or couplings and a capacitive touch type sensor may need 3 or more lines/couplings. Finally, nodes labeled as 119 are coupled to the microcontroller in known manner.

Figure 9:
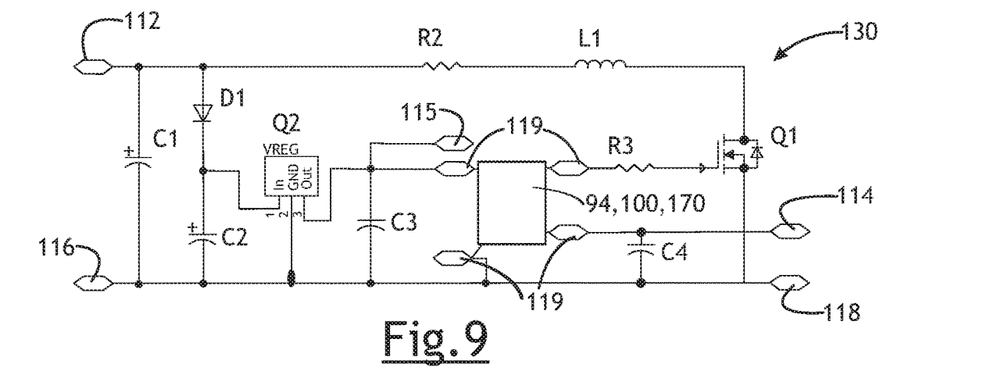
FIG. 9 is a circuit diagram for at least a portion of a control circuit that may be used with a microcontroller.

An alternate circuit 130 is shown in FIG. 9. In this circuit 130 components that are the same as or similar to components in circuit 110 are given the same alphanumeric references as in circuit 110 and will not be described again. This circuit 130 is similar to circuit 110 except, for example, that a voltage regulator VREG replaces resistor R1 and diode D2 and may serve the same function. Again the lines to the level sensor from the microcontroller (e.g. via node 114) can be more than one line or coupling as needed for the sensor being used.

In at least some implementations, power to the microcontroller 94 may be provided from the ouptput/gauge, for example, via node 112 as noted above. The output/gauge may have a power output that normally is provided in a circuit including the level sensor, and the resulting resistance in that circuit that is sensed is a function of the fuel level, as noted above. The output/gauge power output is instead used to power the microcontroller and associated circuit, such as the circuit shown in FIG. 8 which conditions and manages the power to enable microcontroller operation. And the microcontroller, in turn, is responsive to changes in the resistance of the level sensor and is further responsive to provide a signal or otherwise communicate with the gauge/output device to enable a fuel level indication by the gauge/output device.

In more detail, when the transistor Q1 is off, power from the gauge/output device is provided to one or more charge storage devices, such as one or more of the capacitors noted above. The charge storage device(s) then provide power to the microcontroller for operation of the microcontroller. When the transistor Q1 is on, the voltage supplied to the circuit is pulled down and generally not available for charge storage or providing power for use by the microcontroller. However, power can be stored when the transistor is off and provided to the microcontroller to support operation of the controller even when the transistor is on. Next, cycling the transistor Q1 on and off provides a certain resistance to the power output from the gauge/output device, with that resistance changing as the transistor is cycled at a different operating duty (e.g. duty cycle) between the on and off states (e.g. different on and off times). In general, with a higher duty cycle more current passes through the circuit, and this may be interpreted as a lower resistance by the gauge. Thus, the operating duty at which the transistor Q1 is cycled may be varied to change the resistance in the circuit including the gauge/output device, and thereby cause the gauge/output device to provide an indication of the fuel level. In other words, the gauge/output device will be responsive to the operating duty of the transistor cycling and not directly responsive to the resistance of the level sensor, but the gauge output will provide its indication of fuel level in the same manner it would in a system without the circuit (e.g. as a function of the resistance it sees). In this way, the microcontroller may vary the transistor operating duty as a function of the resistance of the level sensor to relay the information from the level sensor to the gauge/output device.

This may be desirable, for example, to permit the microprocessor to account for variations in fuel tanks, level sensor assemblies and installation locations in a tank. The fuel tank variations may be due to tolerances within a production run of fuel tanks, or because the fuel tanks are of different shapes and/or sizes. In this way, for example, a fuel level sensor may be used in a range of tanks that, because they have different shapes, may have different fuel levels at a given resistance level (e.g. one tank may be ½ full at a given resistance in the level sensor and a different tank may be ⅜ full at the same resistance—of course, these are merely examples and are not intended to limit the disclosure or teachings herein). The microcontroller may be programmed or otherwise responsive to control the duty cycle of the transistor at a level to provide the proper fuel level indication from the gauge/output device in either example. The level sensor assemblies may vary as well, as can their installed locations both due to varying part sizes, as well as inconsistencies in installation and the like. The microprocessor may learn the actual fuel levels over time, as noted above with regard to the upper and lower limits, as well as other fuel levels as well, to remove the variances and provide a more accurate indication of the fuel level to the gauge/output device. Such adaptive sensing and control would not occur if the gauge/output device was coupled directly to the level sensor.

Further, because the fuel level circuit 42 may be monitored by or otherwise communicated with a microcontroller 94, the system can accommodate for certain faults. In one example, corrosion or damage to one or more conductive elements 62, 70 may prevent an accurate reading of the fuel level when the contacts 40 are engaged with those conductive elements. Based upon data from recent fuel level indications taken at fuel levels near the fuel level associated with the faulty conductive elements, the fuel level sensor 24 can ignore the faulty resistance signal obtained, or report a reasonably accurate fuel level despite the faulty conductive elements. In other words, the absence of a proper fuel level signal or the presence of a fuel level signal that does not correspond sufficiently with a recent successful fuel level signal can be accounted for by the microcontroller 94 and a reasonably accurate reading can be provided despite a malfunction in the circuit 42. This can avoid or delay the need to repair or replace the substrate 44 and contact areas 58, 60 on the substrate.

Due to fuel sloshing in the tank 13, the orientation or attitude of the fuel tank changing and other things that can change the fuel level in the area of the float 26 without a corresponding change in the total fuel volume within the fuel tank, it may be desirable to damp the output of the fuel level sensor 24 by averaging fuel levels over time, ignoring data indicative of a fuel level rate of change greater than a threshold value over some time period, ignoring data when the attitude or orientation of the fuel tank 13 is outside of a threshold (e.g. the fuel tank is tilted or inclined more than a threshold amount from a normal position) or the like.

Hence, in at least some implementations, a liquid level sensor 24 includes a liquid level responsive member that moves in response to changing liquid level (e.g. a float 26 or the like), an electrically conductive contact associated with the liquid level responsive member (e.g. the contact 40 carried by the float arm 28), a circuit 42 including a rectifying element 90 or 92 and a) one or more conductive elements 62, 70, or b) one or more resistive elements 64, 72, or c) one or more conductive elements and one or more resistive elements, wherein the contact 40 is arranged to engage at least one of the elements in a, b, or c, and a power supply 82 adapted to provide a voltage to the circuit 42 causing a current flow in a first direction in the circuit wherein the current flows through the contact 40 and to provide a current flow in a second direction in the circuit wherein the rectifying element 90 prevents current flow through the contact 40. In at least some implementations and in the situation where the current flow is in the first direction, the resistance in the circuit 42 will change as the position of the contact 40 changes relative to the elements in a, b or c. A detected resistance in the circuit 42 corresponds to a liquid level in the tank 13, assuming relatively steady state conditions (i.e. the tank is not inclined, liquid is not sloshing within the tank, etc.).

In at least some implementations some of which are described above, the circuit 42 includes multiple conductive elements 62, 70 each coupled to a resistive element 64, 72 at different locations along the resistive element. In this way, the total resistance in the circuit 42 changes as the contact 40 engages different conductive elements 62, 70 when the current flows in the first direction. And in at least some implementations, when the current flows in the second direction, the current flows through a portion of the circuit 42 having a maximum resistance. This maximum resistance value may be used as a calibration factor for the level sensor 24 to accommodate for variations among level sensors, variations in the location of level sensors within their respective tanks 13, and the like.

In at least some implementations, the sensor 24 may include a microcontroller 94 through which the power supply 82 is provided to the circuit 42 and through which the direction of the current flow is controlled. The microcontroller 94 may include inputs and outputs suitable to provide or enable the two directions of current flow. The sensor 24 and/or microcontroller 94 may also include memory 96 that stores instructions for operation of the microcontroller 94 and which also stores data related to resistance values in the circuit 42. The data may be used to adjust an output of the sensor 24 to provide a more accurate liquid level determination.

In at least some implementations, a liquid level sensor 24 for determining the level of a liquid within a tank 13 includes a float 26 buoyant in the liquid within the tank, a float arm 28 coupled to the float 26 and moved by the float 26 as the level of liquid in the tank changes, a contact 40 carried by the float arm 28 so that the contact moves with the float arm 28, a variable resistance circuit 42 associated with the contact so that the total resistance in the circuit changes as the contact moves relative to the circuit, the circuit including a rectifying element 90, and a power supply 82 that provides a voltage to the circuit causing a current flow in a first direction in the circuit wherein the current flows through the contact, and wherein the circuit is arranged so that the current also flows in a second direction in the circuit wherein the rectifying element prevents current flow through the contact. The circuit 42 may include multiple conductive elements 62, 70 each coupled to a resistive element 64, 72 at different locations along the resistive element so that the total resistance in the circuit changes as the contact 40 engages different conductive elements when the current flows in the first direction. In at least some implementations, when the current flows in the second direction, the current flows through a portion of the circuit 42 having a maximum resistance.

In at least some implementations, a method of determining a level of a liquid in a container 13 includes the steps of providing a current flow in first direction in a circuit 42 associated with a level sensor 24 to obtain a first resistance value, providing a current flow in a second direction in the circuit to obtain a second resistance value, and determining a liquid level as a function of both the first resistance value and the second resistance value. The first resistance value may be a maximum resistance value in the circuit 42 and the second resistance value may relate to a resistance value associated with an instantaneous liquid level. The second resistance value may be obtained at a lowest liquid level condition in a tank 13 and the determined liquid level may be adjusted as a function of the difference between the first resistance value and the second resistance value. Of course, other methods and arrangements are possible.

Figure 10:
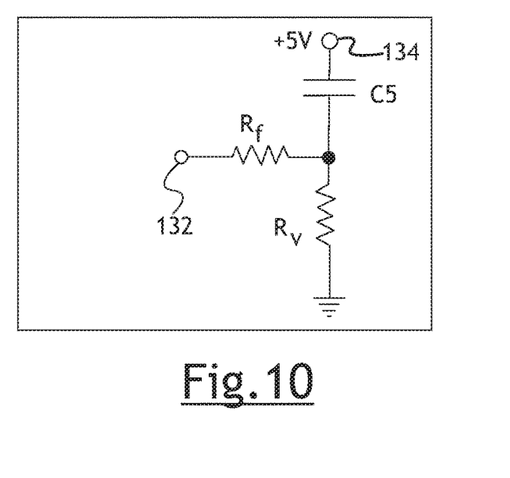
FIGS. 10 and 11 are example circuits that may be used to determine the value of a variable resistor such as may be used in a level sensor as set forth herein.
Figure 11:
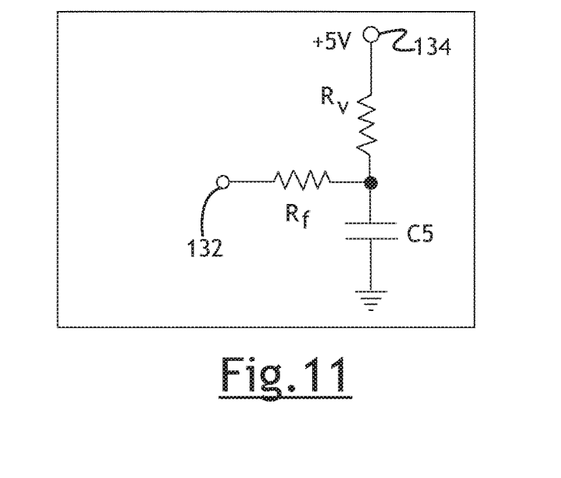

FIGS. 10 and 11 illustrate two circuits that may be used to determine the value of a variable resistor, such as may be used in a level sensor as noted herein. The circuits include a fixed capacitor and a variable resistor (and optionally a fixed resistor to protect the microcontroller from driving too much current when charging the capacitor) coupled to a microcontroller. By measuring or determining the time it takes for the microcontroller pin to change to a defined value, the value of the variable resistor can be determined. This may in turn be used to determine the instantaneous fuel level.

In FIG. 10, a variable resistor Rv is connected to ground and the capacitor C5, with the fixed resistor Rf between them and the microprocessor input/output pin (shown at 132). The capacitor may be coupled to a power supply (e.g. at node 134) that may be at any desired value, such as but not limited to, 5 volts. In FIG. 11, the power supply is coupled to the variable resistor Rv and the capacitor C5, and the capacitor is coupled to ground. The power to charge the capacitor may also be provided through pins of the microcontroller.

The capacitor C5 may be discharged by taking the microcontroller pin from a fixed voltage to a first or floating state. In FIG. 10 this is achieved by setting the pin to be an input so that there is generally zero volts across the resistor Rf, which causes the capacitor to discharge through Rv. In FIG. 11, this is achieved by setting the pin to an input. The capacitor may be discharged for a desired time to ensure that the capacitor is essentially fully discharged, or discharged to a negligible value. When the capacitor is released the pin is set to be a tristate input. And then the time it takes to discharge the capacitor to the trip point of the pin (e.g. the voltage at which the pin changes state, or transitions from logic high to logic low) is determined. This time is a function of the value of the variable resistor Rv and can therefore be used to determine the value of Rv. While the above examples utilize a digital input/output pin of the microcontroller, a similar method may be used with an analog to digital converter.

Figure 12:
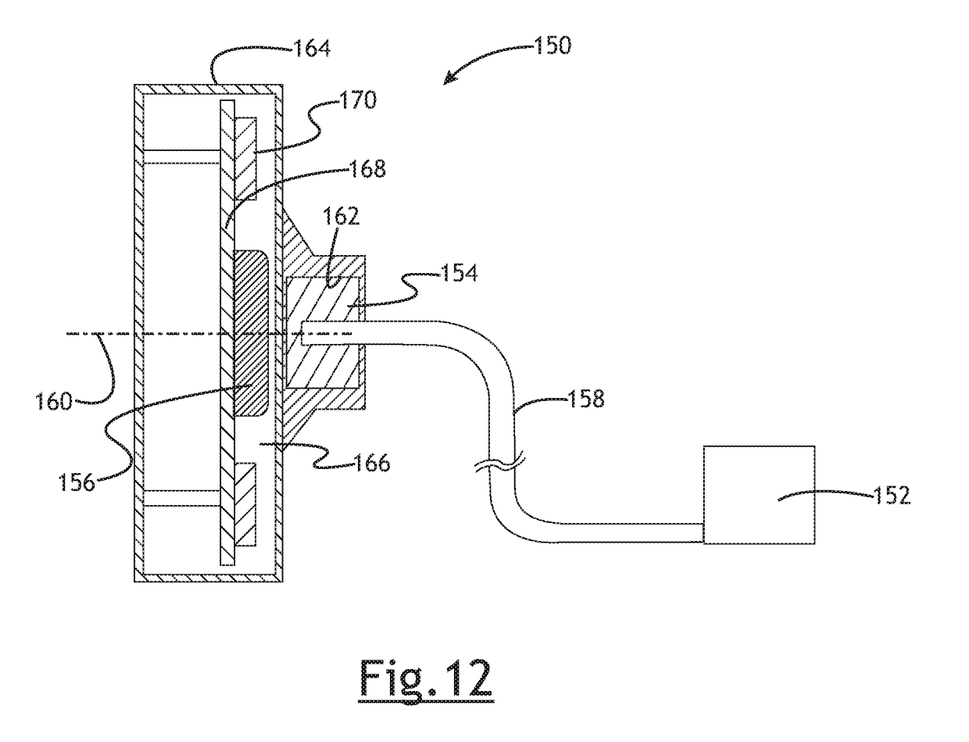
FIG. 12 is a sectional view of a portion of a level sensor including a non-contact sensing arrangement.

FIG. 12 illustrates a level sensor assembly 150 that does not rely upon direct engagement of a conductive contact with a variable resistor. Instead, the level sensor assembly 150 utilizes a non-contact sensor arrangement to detect movement of a float 152 or other fuel level responsive member. In the arrangement shown, the level sensor assembly 150 includes a movable element such as a magnet 154 that is moved as the float 152 moves, and a sensing element or sensor 156 responsive to movement of the movable element/magnet 154 to determine the level or amount of fuel within the tank. In at least some implementations, the magnet 154 is coupled to a float arm 158 and rotates relative to the sensor 156 about an axis 160 as the float arm pivots. In the embodiment shown, the magnet 154 is received within a cylindrical boss or cavity 162 formed in a housing 164. The magnet 154 may be cylindrical and have a circular radial periphery, and may be arranged to rotate within the cavity 162 about the axis 160. The float arm 158 is coupled to the magnet 154 and/or the housing 164 for rotation with the magnet 154 about the axis 160. The sensor 156 may be located axially aligned with the magnet 154 (or otherwise within a magnetic field generated by the magnet) and spaced from the magnet 154 so that there is no direct contact between the magnet and sensor providing a non-contact sensor, if desired. In at least some implementations, the sensor 156 may be received within a sealed chamber 166 in the housing 164 or outboard of the tank so that the sensor 156 is not in direct contact with the liquid in the tank, while the magnet 154 may be outside of the chamber 166. The sensor 156 may be carried by a circuit board 168 that is received within the chamber 166 (or outboard of the tank as noted) so that the circuit board 168 and other components on the circuit board also are not in direct contact with the liquid in the tank.

In use, the float 152 moves as the fuel level in the tank changes which causes the float arm 158 and magnet 154 to rotate about the axis 160. Rotation of the magnet 154 is sensed by the sensor 156 which may, for example, sense the moving or changing magnetic field of the magnet 154 and the sensor 156 provides an output that varies as a function of the rotary or angular position of the magnet 154 (similar to how the resistance varied in the above described examples with a variable resistive element). The sensor output may be analog or digital and may be communicated with a suitable controller or processor 170 which may in turn provide an output indicative of the fuel level in the tank. Instead of or in addition to the rotation about an axis, the magnet 154 may move in other ways relative to the sensor 156, as desired.

The sensor 156 and/or the controller 170 may be communicated with an output such as a gauge or other display, generally as set forth above. For example, one of the circuits 110 and 130 shown in FIGS. 8 and 9 may be functionally arranged between the level sensor assembly 156 and an output (e.g. a gauge showing the fuel level) by node 112 coupled to the gauge and node 114 coupled to the sensor 156 and/or controller 170. Thus, the circuits 110 and 130 and circuits having such characteristics may be used as an interface between a sensor 156 and an output, where the sensor need not include a variable resistor or a contact-based sensing arrangement, and can instead include digital hardware like hall-effect sensors or microprocessors (or other controllers).

Further, the sensor 156 may be powered via the circuit 110 or 130 rather than requiring a separate power supply (e.g. dedicated power wire) directly to the sensor. So, for example, the sensor 156 may be powered by the same power source that provides power to the processor 170. Further, the memory accessed by the processor 170 may be loaded with data indicative of fuel level as a function of various sensor outputs, or with functions or equations that permit calculation or estimation of fuel level as a function of or in relation to various sensor outputs (e.g. a linear or quadratic equation set to permit determination of remaining fuel volume or level). Thus, the system can be arranged for use with a range of fuel tanks and a given sensor and processor 170 can be readily used to provide a fuel level indication in a wide range of applications.

The sensor 156 may also be communicated with or communicate with the processor 170 via serial communication. One potential benefit of serial communication over the typical analog communication is better accuracy without significant cost increase. The serial communications can be less vulnerable to accuracy loss due to electronic noise distortion, especially when the Analog/Digital conversion is done near the source and then transmitted over the communication line. Serial communication also may have more error corrections methods for distance and distorted communication that analog signals do. Additionally, use of serial communications opens up options like sending fuel data over CAN, LN or any other communication bus to enable use with a wide range of systems.

Further, other types of contact based or non-contact sensor arrangements may be used in a fuel level sensor. For example, while specific implementations including a resistive fuel level sensor circuit and a magnetic responsive sensor 156 have been shown and described as examples with conditions (e.g. outputs) that change as the fuel level changes, the innovations may be utilized with other fuel level sensors to which power is supplied and a controller which may also be powered. One non-limiting example is a capacitive touch sensor circuit, although others may be used.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A liquid level sensor, comprising:
   a liquid level responsive member that moves in response to changing liquid level;
   an electrically conductive contact associated with the liquid level responsive member;
   a circuit including a rectifying element and a) one or more conductive elements, or b) one or more resistive elements or c) one or more conductive elements and one or more resistive elements, wherein the contact is arranged to engage at least one of the elements in a, b, or c; and
   a power supply adapted to provide a voltage to the circuit causing a current flow in a first direction in the circuit wherein the current flows through the contact and to provide a current flow in a second direction in the circuit wherein the rectifying element prevents current flow through the contact.

2. The sensor of claim 1 wherein the circuit includes multiple conductive elements each coupled to a resistive element at different locations along the resistive element so that the total resistance in the circuit changes as the contact engages different conductive elements when the current flows in the first direction.

3. The sensor of claim 2 wherein, when the current flows in the second direction, the current flows through a portion of the circuit having a maximum resistance.

4. The sensor of claim 1 which also includes a microcontroller that receives power from the circuit and through which the direction of the current flow is controlled.

5. The sensor of claim 4 which also includes memory that stores instructions for operation of the microcontroller and which also stores data related to resistance values in the circuit.

6. The sensor of claim 1 wherein the liquid level responsive member is a float that is buoyant in the liquid, and wherein the sensor includes:
   a float arm coupled to the float and moved by the float as the level of liquid in the tank changes,
   the contact carried by the float arm so that the contact moves with the float arm;
   a variable resistance circuit associated with the contact so that the total resistance in the circuit changes as the contact moves relative to the circuit, the circuit including the rectifying element, and the circuit is arranged so that the rectifying element prevents current flow through the contact when current flows in the second direction.

7. The sensor of claim 6 wherein the circuit includes multiple conductive elements each coupled to a resistive element at different locations along the resistive element so that the total resistance in the circuit changes as the contact engages different conductive elements when the current flows in the first direction.

8. The sensor of claim 7 wherein, when the current flows in the second direction, the current flows through a portion of the circuit having a maximum resistance.

9. The sensor of claim 6 which also includes a microcontroller that receives power from the circuit and through which the direction of the current flow is controlled.

10. The sensor of claim 9 which also includes memory that stores instructions for operation of the microcontroller and which also stores data related to resistance values in the circuit.

* * * * *